United States Patent
Fang

(10) Patent No.: US 6,999,742 B2
(45) Date of Patent: Feb. 14, 2006

(54) BY-PASSING ADJACENT CHANNEL INTERFERENCE REMOVAL IN RECEIVERS

(75) Inventor: George Fang, Summit, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 458 days.

(21) Appl. No.: 10/205,686

(22) Filed: Jul. 26, 2002

(65) Prior Publication Data

US 2004/0018824 A1 Jan. 29, 2004

(51) Int. Cl.
 *H04B 1/06* (2006.01)
 *H04B 7/00* (2006.01)
 *H04B 1/16* (2006.01)

(52) U.S. Cl. .................. 455/266; 455/340
(58) Field of Classification Search .......... 455/266, 455/339, 340, 188.1
See application file for complete search history.

(56) References Cited

U.S. PATENT DOCUMENTS

| | | | |
|---|---|---|---|
| 4,385,402 A * | 5/1983 | Barrs ............. | 455/339 |
| 4,731,877 A * | 3/1988 | Moon ............. | 455/340 |
| 5,001,776 A * | 3/1991 | Clark ............. | 455/226.2 |
| 5,023,939 A * | 6/1991 | Hori ............. | 455/188.1 |
| 5,303,413 A * | 4/1994 | Braegas ............. | 455/266 |
| 5,339,455 A * | 8/1994 | Vogt et al. ............. | 455/266 |
| 5,758,296 A * | 5/1998 | Nakamura ............. | 455/575.7 |
| 6,112,069 A | 8/2000 | Na ............. | 455/296 |
| 6,233,442 B1 * | 5/2001 | Koda et al. ............. | 455/266 |

FOREIGN PATENT DOCUMENTS

JP  58-210727  * 11/1983

* cited by examiner

*Primary Examiner*—Nguyen T. Vo
(74) *Attorney, Agent, or Firm*—Dirk Brinkman; Andrew J. Curtin

(57) ABSTRACT

A heterodyne receiver includes a tuner to select a frequency of a received signal and a converter to change the frequency of the received signal to an intermediate frequency. A single-pole/double throw switch has an input coupled to an output of the converter, a first output connected to a first band-pass filter and a second output connected to an amplifier. A second band-pass filter is coupled to an output of the amplifier, and a demodulator is coupled to an output of the second band-pass filter to produce an output signal and a characteristics signal. A logic circuit is coupled to receive the characteristics signal and for by-passing the first band-pass filter if the characteristics signal is less than a predetermined threshold.

5 Claims, 1 Drawing Sheet

BY-PASSING ADJACENT CHANNEL INTERFERENCE REMOVAL IN RECEIVERS

FIELD OF THE INVENTION

This invention relates generally to heterodyne communications receivers, and more particularly reducing interference in heterodyne receivers.

BACKGROUND OF THE INVENTION

In a heterodyne receiver, a received signal is shifted to a much lower fixed intermediate frequency (IF) while leaving information modulated on the carrier signal unaltered. The lower frequency signal is easier to process. The required frequency translation to the intermediate frequency is usually accomplished by mixing the received signal with a locally generated signal which differs from the received signal by the intermediate frequency.

In a typical heterodyne receiver, there is at least one band-pass filter at the IF stage designed to reject signals in adjacent channels. Performance requirements imposed on the receiver, or insufficient rejection ratio of a single band-pass filter, may require additional band-pass filter in order to adequately reduce interference from adjacent channels. These band-pass filters can have significant insertion loss depending on their design Heterodyne receivers are usually designed with sufficient filtering to satisfy the required performance specifications while operating under worst adjacent channel interference conditions, even though such interference is not always present. Multiple filters, when uncompensated, can attenuate or otherwise degrade the received signal. This is especially true when a series of filters are cascaded, because insertion loss is additive, see U.S. Pat. No. 6,112,069 "Radio receiver and method for suppressing attenuation properties of a low frequency signal," issued to Na on Aug. 29, 2000.

SUMMARY OF THE INVENTION

It is an object of the invention is to provide a receiver with improved performance when adjacent channel interference is absent or weaker than a predetermined level.

In a receiver according to the invention, band-pass filters are by-passed when adjacent channel interference is less than a predetermined threshold to improve the reception performance. In a preferred embodiment, a switch is added in parallel to one or more of the band-pass filters used at the intermediate frequency stage of a heterodyne receiver. When this switch is closed, the insertion loss of the band-pass filter is eliminated. Thereby increasing the total system gain enabling the reception of weaker signals.

More particularly, the receiver includes a tuner configured to select a frequency of a received signal, a converter, coupled to an output of the tuner, for changing the frequency of the received signal to an intermediate frequency, a band-pass filter coupled to an output of the converter, an amplifier coupled to an output of the band-pass filter, a demodulator coupled to an output of the amplifier to produce an output signal and an output characteristic signal, and a switch for by-passing the band-pass filter if the characteristic signal is less than a predetermined threshold.

DETAILED DESCRIPTION OF THE PREFERRED EMBODIMENT

System Structure

Figure 1:
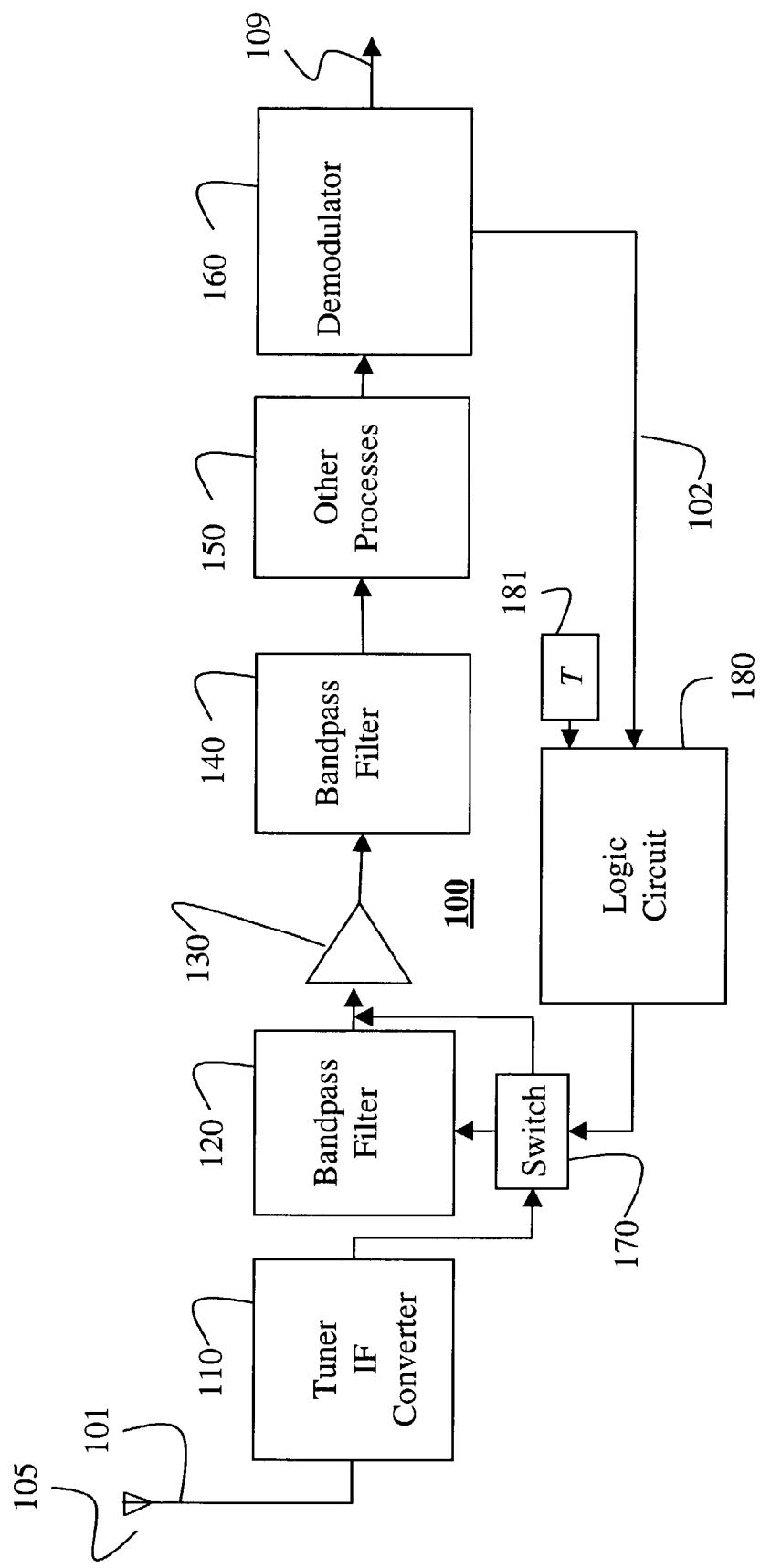
FIG. 1 is a block diagram of a by-pass circuit for a receiver according to the invention.

In FIG. 1, a heterodyne receiver 100 includes a tuner and IF converter 110, a first band-pass filter 120, an amplifier 130, a second band-pass filter 140, other receiver components 150, and a demodulator 160, connected in series. A single-pole/double throw by-pass switch 170 is coupled in parallel with the band-pass filter 120. The switch is controlled by a logic circuit 180 receiving a characteristics signal 102 from the demodulator 160.

System Operation

During operation of the receiver 100, an input signal 101 is received by an antenna 105. This signal passes through the tuner 110, and a heterodyne process converts the selected received signal to an intermediate frequency (IF). This signal is filtered 120, amplified 130, re-filtered 140, and subjected to further processing 150, such as additional frequency conversions, before the signal is demodulated 160 to an output signal 109.

The demodulator 160 produces the characteristic signal 102. This signal is a function of the input to the demodulator 160, and of the output signal 109 such as, but not limited to, signal-to-noise ratio, estimate of adjacent channel interference strength, and/or estimated error of the output signal. The characteristic signal 102 is compared with a threshold T 181 by the logic circuit 180. The switch 170 is closed if the output characteristic signal 102 is less than the threshold 181.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A heterodyne receiver comprising:
   a tuner configured to select a frequency of a received signal;
   a converter, coupled to an output of the tuner, for changing the frequency of the received signal to an intermediate frequency;
   a single-pole/double throw switch having an input directly coupled to an output of the converter;
   a first band-pass filter directly coupled to a first output of the single-pole/double throw switch;
   an amplifier directly coupled to a second output of the single-pole/double throw switch and the first band-pass filter;
   a second band-pass filter directly coupled to an output of the amplifier;
   a demodulator coupled to an output of the second band-pass filter to produce an output signal and a characteristics signal; and
   a logic circuit coupled to receive the characteristics signal and by-passing the first band-pass filter if the characteristics signal is less than a predetermined threshold.

2. The receiver of claim 1 wherein the receiver includes a plurality of band-pass filters, and further comprising means for selectively by-passing any of the plurality of band-pass filters.

3. The receiver of claim 1 wherein the characteristic signal is a function of an input to the demodulator and of the output signal.

4. The receiver of claim 3 wherein the characteristics signal is a function of a signal-to-noise ratio, an estimate of adjacent channel interference strength, and an estimated error of the output signal.

5. A method for processing an input signal, comprising:
receiving the input signal at a selected frequency;
converting the input signal at the selected frequency to an intermediate frequency;
first filtering the input signal at the intermediate frequency;
amplifying the filtered input signal;
second filtering the amplified input signal;
demodulating the filtered input signal to produce an output signal and a characteristics signal; and
by-passing the first filtering of the input signal so that only the amplified input signal is filtered if the characteristics signal is less than a predetermined threshold.

* * * * *